US008528810B1

(12) United States Patent
Rojas et al.

(10) Patent No.: US 8,528,810 B1
(45) Date of Patent: Sep. 10, 2013

(54) SYSTEM AND METHOD FOR ISSUANCE, USE, AND REPLACEMENT OF MULTI-PURPOSE DEVICES

(75) Inventors: Jose A. Rojas, Powell, OH (US); Jonathan Taylor, Delaware, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 326 days.

(21) Appl. No.: 12/823,731

(22) Filed: Jun. 25, 2010

(51) Int. Cl.
*G06K 5/00* (2006.01)

(52) U.S. Cl.
USPC ............................................ 235/380; 235/384

(58) Field of Classification Search
USPC ....................... 235/380, 381, 384; 705/13
See application file for complete search history.

(56) References Cited

U.S. PATENT DOCUMENTS

| | | | | |
|---|---|---|---|---|
| 5,984,191 | A * | 11/1999 | Chapin, Jr. ...................... | 235/493 |
| 7,527,208 | B2 | 5/2009 | Hammad et al. | |
| 8,020,766 | B2 | 9/2011 | Hammad | |
| 2005/0092830 | A1 * | 5/2005 | Blossom ........................ | 235/380 |
| 2008/0128513 | A1 * | 6/2008 | Hammad et al. ............... | 235/492 |
| 2009/0144136 | A1 * | 6/2009 | Cohagan et al. ................ | 705/13 |

* cited by examiner

*Primary Examiner* — Ahshik Kim
(74) *Attorney, Agent, or Firm* — Hunton & Williams LLP (57) ABSTRACT

Systems and methods for issuance, use, and replacement of multi-purpose devices are disclosed. A method for providing a multi-purpose device for use with a plurality of systems may include (1) a first party assigning a first account number to the multi-purpose device, the first account number associated with a first account with the first party for use in a first system; (2) the first party assigning a second account number to the multi-purpose device, the second account number associated with a second account with a second party for use in a second system; and (3) the first party issuing the multi-purpose device to a customer. A system for using a multi-purpose device for use with a plurality of systems may include a first transaction system; a second transaction system, and a multi-purpose card issued by a first party that includes a first account number to the multi-purpose device, the first account number associated with a first account with the first party for use in the first transaction system; and a second account number to the multi-purpose device, the second account number associated with a second account with a second party for use in the second transaction system.

8 Claims, 5 Drawing Sheets

SYSTEM AND METHOD FOR ISSUANCE, USE, AND REPLACEMENT OF MULTI-PURPOSE DEVICES

BACKGROUND OF THE INVENTION

1. Field of the Invention

The present invention generally relates to transaction cards, and, more particularly, to a system and method for issuance, use, and replacement of dual use cards.

2. Description of the Related Art

Mass transit authorities, such as San Francisco's Bay Area Rapid Transit District, and Washington D.C.'s Washington Metropolitan Area Transit Authority, issue farecards to riders that provide the convenience of allowing riders to pay for fares without using cash. These cards may be pre-paid, they may be reloadable at the station, or they may be linked to an account that the cardholder maintains with the transit authority.

SUMMARY OF THE INVENTION

Systems and methods for issuance, use, and replacement of multi-purpose devices are disclosed. According to one embodiment, a method for providing a multi-purpose device for use with a plurality of systems may include (1) a first party assigning a first account number to the multi-purpose device, the first account number associated with a first account with the first party for use in a first system; (2) the first party assigning a second account number to the multi-purpose device, the second account number associated with a second account with a second party for use in a second system; and (3) the first party issuing the multi-purpose device to a customer.

The multi-purpose device may be a transaction card, a smart card, a fob, a sticker, a token, a memory card, a mobile phone, a PDA, etc., and the first account number and the second account number may be visible on the multi-purpose device.

The first party may be a financial institution. The second party may be a transit authority, a municipality, a parking authority, a school district, a government agency, a country club, a shopping club, etc.

The first party may also activate the first account and the second account in response to an activation of the first account.

The first party may also provide the second party with an electronic file that includes at least one of the first account number, the second account number, and a match number common to both the first account number and the second account number. The electronic file may also include an initial value, a new/replacement indicator, a transit rider type, a date of issue, a date of replacement, a random number, a counter, and/or payment information.

According to another embodiment, a method for replacement of a multi-purpose device for use with a plurality of systems may include (1) a first party receiving a replacement request for the multi-purpose device, the multi-purpose device having a first account number associated with a first account with the first party for use in a first system and a second account number associated with a second account with a second party for use in a second system; (2) the first party retrieving a replacement multi-purpose device, the replacement multi-purpose device having at least a third account number; (3) the first party updating a database for the second party to associate the third account number with the second account; and (4) the first party activating the third account number.

The multi-purpose device may be a transaction card, a smart card, a fob, a sticker, a token, a memory card, a mobile phone, a PDA, etc., and the first account number and the second account number may be visible on the multi-purpose device.

The method may further include transferring at least one of a value and a status for the second account to the replacement multi-purpose device.

The first party may also provide the second party with an electronic file that includes at least one of the first account number, the second account number, and a match number common to both the first account number and the second account number. The electronic file may also include an initial value, a new/replacement indicator, a transit rider type, a date of issue, a date of replacement, a random number, a counter, and/or payment information.

According to one embodiment, a system for using a multi-purpose device for use with a plurality of systems may include a first transaction system; a second transaction system, and a multi-purpose card issued by a first party that includes a first account number to the multi-purpose device, the first account number associated with a first account with the first party for use in the first transaction system; and a second account number to the multi-purpose device, the second account number associated with a second account with a second party for use in the second transaction system.

The system may further include an interface to an account database of the second party for the first party.

The multi-purpose device may be a transaction card, a smart card, a fob, a sticker, a token, a memory card, a mobile phone, a PDA, etc., and the first account number and the second account number may be visible on the multi-purpose device The first transaction system may be a financial transaction system. The second transaction system may be a transit system. The second party may be a municipality, a parking authority, a school district, a government agency, a country club, and a shopping club.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-5, wherein like reference numerals refer to like elements.

The following disclosures are related to the present invention: U.S. Pat. No. 7,702,538, entitled "System and method for transponder-enabled account transactions"; U.S. Pat. No. 6,032,136, entitled "Customer activated multi-value (CAM) card"; U.S. Pat. No. 7,668,777, entitled "System and method for providing instant-decision, financial network-based payment cards"; U.S. Pat. No. 7,096,003, entitled "Transaction security apparatus"; U.S. Pat. No. 5,708,422, entitled "Transaction authorization and alert system"; U.S. Pat. No. 6,535,855, entitled "Push banking system and method"; U.S. Pat. No. 4,554,418, entitled "Information monitoring and notification method and apparatus"; U.S. patent application Ser. No. 09/630,595, entitled "System and method for transponder enabled account transactions"; U.S. patent application Ser. No. 10/401,749, entitled "System and process for performing purchase transactions using tokens"; U.S. patent application Ser. No. 11/942,211, entitled "System and method for granting access to a restricted area using an approved list"; U.S. patent application Ser. No. 12/433,162 entitled "Vertically-Oriented financial instrument"; U.S. Pat. No. 5,053,774; U.S. Pat. No. 5,103,079; U.S. Pat. No. 5,212,373; U.S. Pat. No. 5,337,063; U.S. Pat. No. 5,286,955; U.S. Pat. No. 5,449,894; U.S. Pat. No. 5,479,172; U.S. Pat. No. 5,484,997; U.S. Pat. No. 5,504,321; U.S. Pat. No. 5,569,903; U.S. Pat. No. 5,828,044; PCT Publication No. WO 91/14237; PCT Publication No. WO 94/22115; and UK Patent Application GB 2267626. The disclosures of these patents, applications and any continuations are expressly incorporated by reference herein.

In one embodiment, the invention may provide a single point of issue for a multi-purpose device that may be used in the systems provided by multiple parties. For example, a financial institution may issue a single multi-purpose device that functions as a financial transaction device for the financial institution and a transaction device that may be used in a third party's system, such as a transit authority, a municipality, a parking authority, a school district, a government agency, a country club, a shopping club (e.g., Costco, Sam's Clubs), etc.

In one embodiment, the financial institution may be a bank, a credit card issuer, a credit union, etc.

In one embodiment, the identity of the multi-purpose device holder may be known only by the issuer of the multi-purpose device (e.g., the financial institution). In one embodiment, the device holder may choose to let his or her identity be known to any other party.

According to one embodiment, a multi-purpose device may be provided. A multi-purpose device may include, for example, transaction cards, smart cards, fobs, stickers, tokens, electronic devices, memory cards, cell phones, PDAs, etc. In one embodiment, the above devices may be enabled to communicate wirelessly, including, for example, by RF, IR, optically, etc.

In one embodiment, the multi-purpose device may be associated with a plurality of accounts. For example, the multi-purpose device may be associated with a first account, such as a financial transaction account (e.g., a credit card, debit card, stored value card, etc.). The multi-purpose device may also be associated with at least one additional account, such as a transit account, a parking authority account, a lunch program account, a country club account, a shopping club account, a government-subsidized account, an employer-subsidized account, a pre-tax funded account, etc. Any suitable account may be associated with the multi-purpose card as necessary and/or desired.

In one embodiment, any or all of the accounts may have use restrictions (e.g., limited to specific merchant category codes, merchants, times, etc.). In one embodiment, the restrictions may be used to ensure compliance with IRS requirements.

In one embodiment, the multi-purpose device may be used with at least one transit authority and may provide the same functionality as a farecard issued by a transit authority solely for use in that transit authority's system. For example, the multi-purpose device may provide features including monthly passes and fees, weekly passes and fees, weekend passes and fees, after-hour passes and fees, bonuses, on-line account management, on-line use tracking, lost device recovery, tax benefits, or any other features that may be available to customers using a card issued solely from the transit authority.

The transaction conducted with the multi-purpose device may be a method of payment or a method of gaining access. Although the multi-purpose device is described in the context of accessing and/or paying for use of a transit system, it may have other applications, including, for example, paying/accessing parking meters, paying/accessing parking fares, paying/accessing taxi fares, paying/accessing for a vehicle rental (e.g., automobile, bicycle, motorcycle, scooter, etc.), paying tolls, paying/accessing a restricted area such as, for example, a parking garage, a concert, a sporting event, etc. Further, the term "transit system" includes any suitable form of transit, including taxi, bus, rail, boat, ferry, car, plane, helicopter, school bus, etc.

In general, transit systems are either open systems or closed systems. Open systems are systems in which the transit fee is a banking transaction (i.e., linked directly to an existing bank account, including checking, saving, credit, etc.). Closed systems are systems in which the transit fees are deducted from an account with the transit authority. Open transit systems are popular in Asia, while closed transit systems are common in the United States. Examples of closed transit systems in the United States include San Francisco's Bay Area Rapid Transit (BART) and Washington D.C.'s Metro system.

In one embodiment, the multi-purpose device may be used with both open and closed systems.

In a closed system, the transit account may be replenished by charging the customer's debit, credit account, or other account. This replenishment may occur in any suitable fashion, including, for example, at the request of the customer, periodically, when the account balance falls below a certain amount, etc.

When used as a transit device with an open system, the fee for the transit may be deducted directly from the customer's debit/checking/savings account, charged to the customer's credit account, etc. In one embodiment, in an open system, the transaction may be a "pay as you go" transaction (e.g., the device holder pays for each ride individually) or the transaction may be one in which the device number is used to verify that the device holder has purchased a pass (e.g., daily, weekly, monthly, etc.). In the latter, a financial transaction may not occur every time the device is used to access the system.

In another embodiment, the multi-purpose device may also be used as a financial transaction instrument, for example, as a credit card, a stored value card, a debit card, etc.

In one embodiment, the functionality of the multi-purpose device as a transit device may be separate from the function as a financial instrument. For example, when the device is used to complete a financial transaction, the financial transaction may use point-of-sale devices, credit or debit networks and approval systems, etc. When the multi-purpose device is used as a transit device, authorization and approval may be processed by the transit authority's system, using the customer's transit account. Thus, the device holder's credit account, stored value account, debit account, pre-paid account, etc. may not be directly accessed in order to use the transit system.

Figure 1:
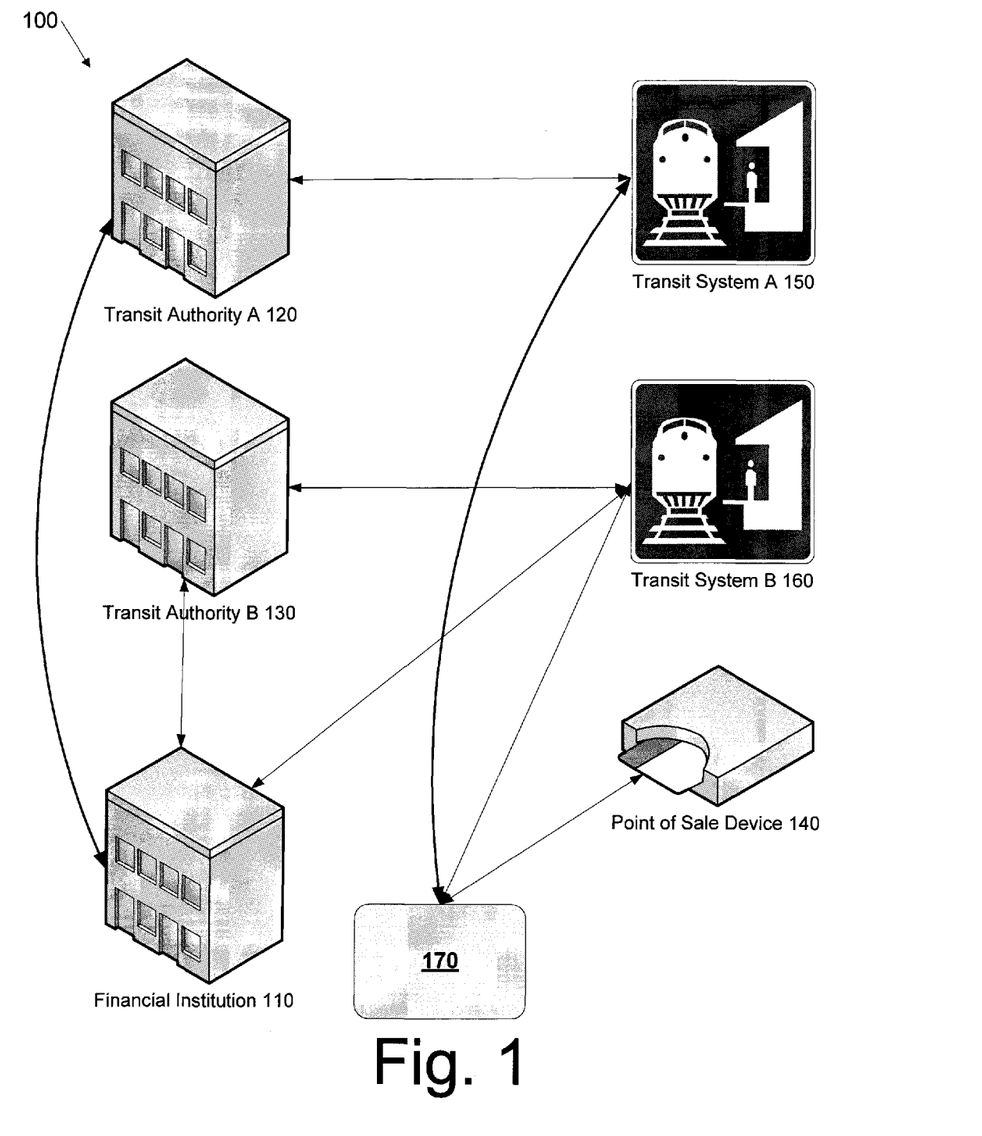
FIG. 1 is a schematic of a system for using multi-purpose devices with multiple transit authorities according to an embodiment of the present invention.

Referring to FIG. 1, an example of a system for using a multi-purpose device is illustrated. In one embodiment, system 100 may include financial institution 110; first transit authority 120; second transit authority 130; point of sale (POS) terminal 140; first transit system 150, second transit system 160, and multi-purpose device 170. Although only two transit authorities and systems are illustrated in this figure, it should be understood that additional transit authorities and transit systems may be included as necessary and/or desired. Further, as discussed above, other entities (e.g., a municipality, a parking authority, a school district, a government agency, a country club, a shopping club (e.g., Costco, Sam's Clubs)) may be represented by one or more of the transit authorities.

Similarly, although only a single POS terminal is illustrated, it should be recognized that any number or type of point of sale devices, including on-line devices, may be included as necessary and/or desired. Further, POS terminal 140 may communicate with financial institution 110, or it may communicate with another financial institution, such as an acquirer (not shown).

In one embodiment, transit systems 150 and 160 may be open transit systems or closed transit systems. For illustrative purposes only, transit system 150 is represented as a closed transit system, while transit system 160 is represented as an open transit system.

Figure 2:
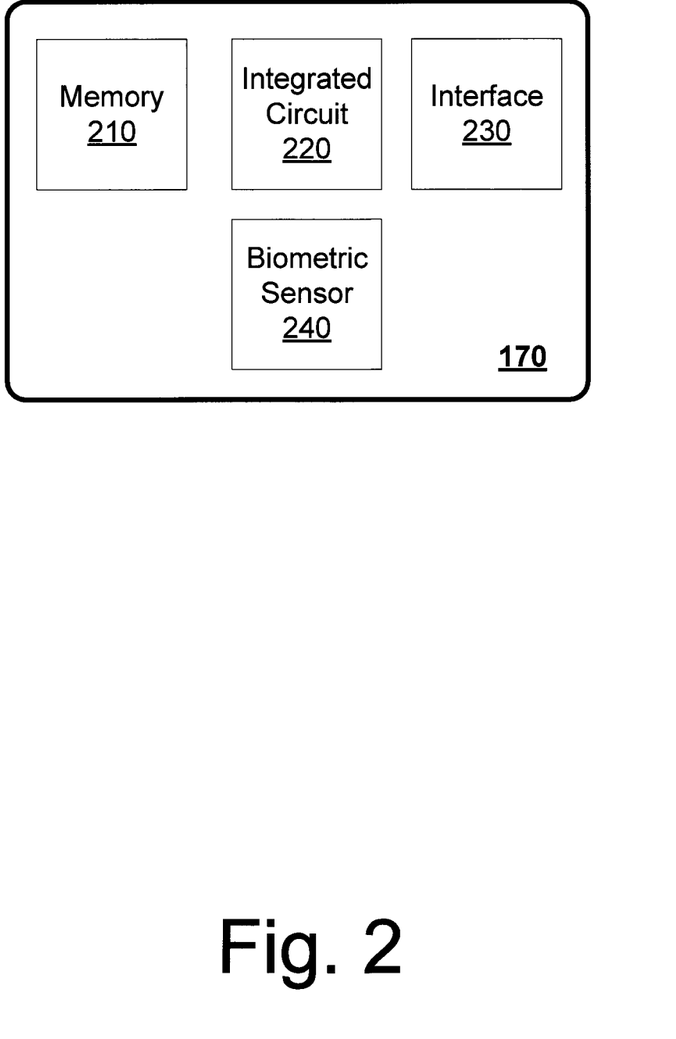
FIG. 2 is a schematic depicting a multi-purpose device according to an embodiment of the present invention.

Referring to FIG. 2, in one embodiment, multi-purpose device 170 may include memory 210, integrated circuit 220, interface 230, and biometric sensor 240. Multi-purpose device 170 may have the traditional credit card form-factor, or it may be larger or smaller, or it may be a key fob, token, PDA, memory cards (e.g., micro-SD cards), cell phone, a sticker, or any other RF-enabled device.

Multi-purpose device 170 may be self-powered (e.g., by induction), or it may rely on an external source to generate power (e.g., a battery).

In one embodiment, memory 210 may store one or more applications for interacting with one or more transit authorities, POS devices, etc. In one embodiment, integrated circuit 220 may execute one or more applications stored in memory 210 to select the appropriate application for the specific transit agency. In one embodiment, the applications may be downloaded into memory 210 through interface 230.

Interface 230 may be any suitable interface, including contact and contactless interfaces. In one embodiment, interface 230 may include a port (not shown) that permits multi-purpose device 170 to be connected to a computer (not shown). In another embodiment, interface 230 may be a wireless interface that provides, for example, RF communication, near field communication, Bluetooth®, etc. In one embodiment, multi-purpose device 170 may include a switch (not shown) to disable wireless communication.

In one embodiment, interface 230 may include an antenna (not shown).

In one embodiment, interface 230 may also include a magnetic stripe (not shown) that may be read by a magnetic stripe reader.

In one embodiment, multi-purpose device 170 may include biometric sensor 240. In one embodiment, biometric sensor 240 may be used in order to authorize use of multi-purpose device 170.

In one embodiment, multi-purpose device 170 may include the necessary functionality to be used as a financial instrument.

Figure 3:
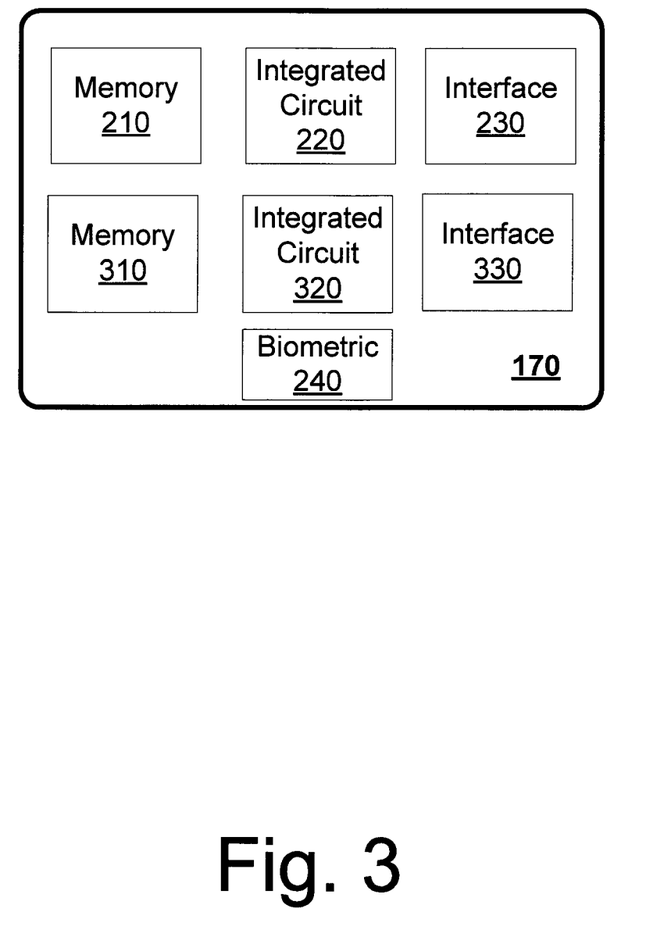
FIG. 3 is a schematic depicting a multi-purpose device according to another embodiment of the present invention.

In one embodiment, one or more of memory 210, integrated circuit 220, and interface 230 may be used when the device is used as a transit device and when the device is used as a financial instrument. Referring to FIG. 3, in another embodiment, multi-purpose device 170 may include an additional memory 310, integrated circuit 320, and interface 330.

Figure 4:
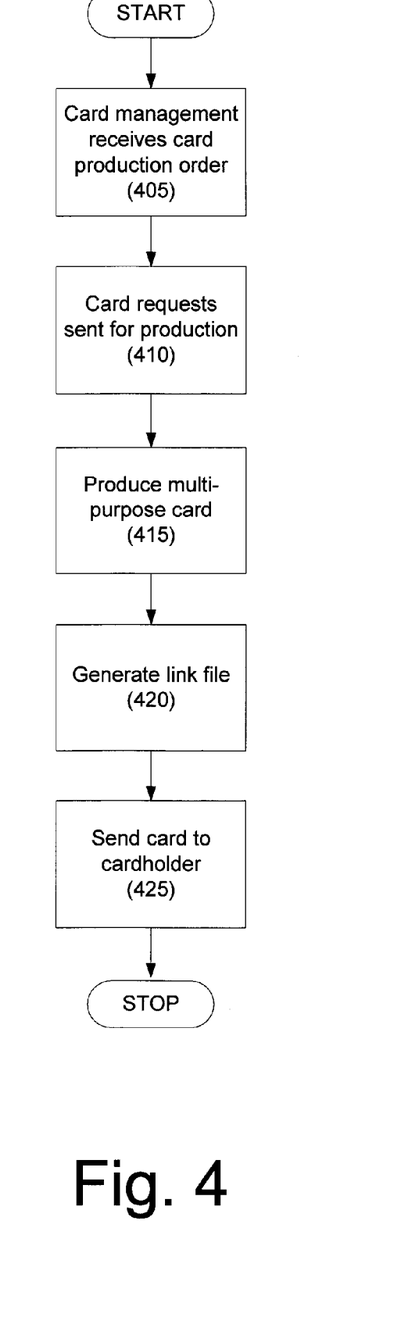
FIG. 4 is a flowchart depicting a method for issuing a multi-purpose device according to an embodiment of the present invention.

Referring to FIG. 4, a method for multi-purpose device issuance according to one embodiment is provided. In step 405, the device management system may receive requests for the multi-purpose device. In one embodiment, this request may be received individually, or requests may be received in batches (e.g., hourly, daily, etc.). In one embodiment, the requests may be received from individuals, branches, customer service representatives, on-line customer requests, telephone requests, kiosks, ATMs, in-person, etc.

In one embodiment, the requests may include device replacement requests.

In one embodiment, the request may be received from an agent taking applications in person. In one embodiment, the agent may be human. In one embodiment, the device processing request may be received from an automated agent (e.g., a kiosk).

After the production requests are received, in step 410, the requests may be sent individually, by batches, etc. to a device processing center for fulfillment. This may include, for example, multi-purpose device production.

In one embodiment, the device processing center may be co-located with the agent. In another embodiment, the device processing center may be centralized.

In step 415, the multi-purpose device is produced. In one embodiment, the device may also be provided with a transit serial number that may be used to interact with the transit systems. In one embodiment, the multi-purpose device may be pre-printed with the transit serial number. In another embodiment, the transit serial number may be removeably affixed to the multi-purpose device. In another embodiment, the transit serial number may be machine readable. In still another embodiment, the transit serial number may be programmed into a magnetic stripe, a memory, etc. of the multi-purpose device.

In one embodiment, the multi-purpose device may include a financial serial number, such as a sixteen digit number.

In one embodiment, the device that is issued may be a temporary device. In one embodiment, the temporary device may be, or may intended to be, replaced with another device. For example, if a temporary paper/plastic card that contains account information that is printed is issued on-the-spot, the temporary card may be later replaced with an embossed card.

In one embodiment, a link to the transit authority's account systems may be provided at the device processing center. For example, a terminal with access to the transit authority's accounts may be provided to establish a new account within the transit authority based on the transit serial number.

In step 420, a file that links a banking account number to the transit serial number may be generated. In one embodiment, this may be an electronic file.

In one embodiment, the file may contain one or more of the following: an initial value; an indication as to whether this is a new device or a replacement device; the type of transit rider (e.g., normal, student, senior citizen, etc.); the date of issue; the date of replacement; a random number; a counter; rider geographic information (e.g., city, state, zip code); a key to personalize the device; a match number that is linked to both the transit account and the financial account; a payment method for the transit account; checking account routing number; and any other information that is necessary and/or desired.

In step 425, the multi-purpose device is provided to the multi-purpose device holder. In one embodiment, this may include mailing the device to the device holder. In another embodiment, the multi-purpose device may be provided directly to the multi-purpose device holder.

In step 430, the multi-purpose device holder may receive the multi-purpose device and perform any necessary device activation actions. In one embodiment, the device may be issued fully initialized and may not require initialization. In another embodiment, fewer than all features may require initialization by the multi-purpose device holder. For example, the credit card functionality of the multi-purpose device may not require multi-purpose device holder initialization, while the debit card functionality may require such initialization.

Activation may be performed by any suitable technique, including, for example, on-line activation, telephone activation, ATM activation, etc.

In one embodiment, the multi-purpose device holder may also register the transit serial number with the appropriate transit authority or transit authorities. In one embodiment, the multi-purpose device holder may not be required to register his or her transit serial number.

In one embodiment, the multi-purpose device holder may have the option of remaining anonymous to the transit authority. In one embodiment, since the transit system authority uses the transit serial number to access the account, device holder personal data (e.g., name, address, phone number, etc.) is not provided to the transit authority.

In one embodiment, the multi-purpose device holder may opt into providing personal information to the transit authority.

In one embodiment, the issuer (e.g., the financial institution) is the only entity that knows both the multi-purpose device holder's account number and the transit serial number. In another embodiment, a match number that is linked to both the account number and the transit number may be provided. This match number may be particularly useful in interactions between the financial institution and the transit authority.

Figure 5:
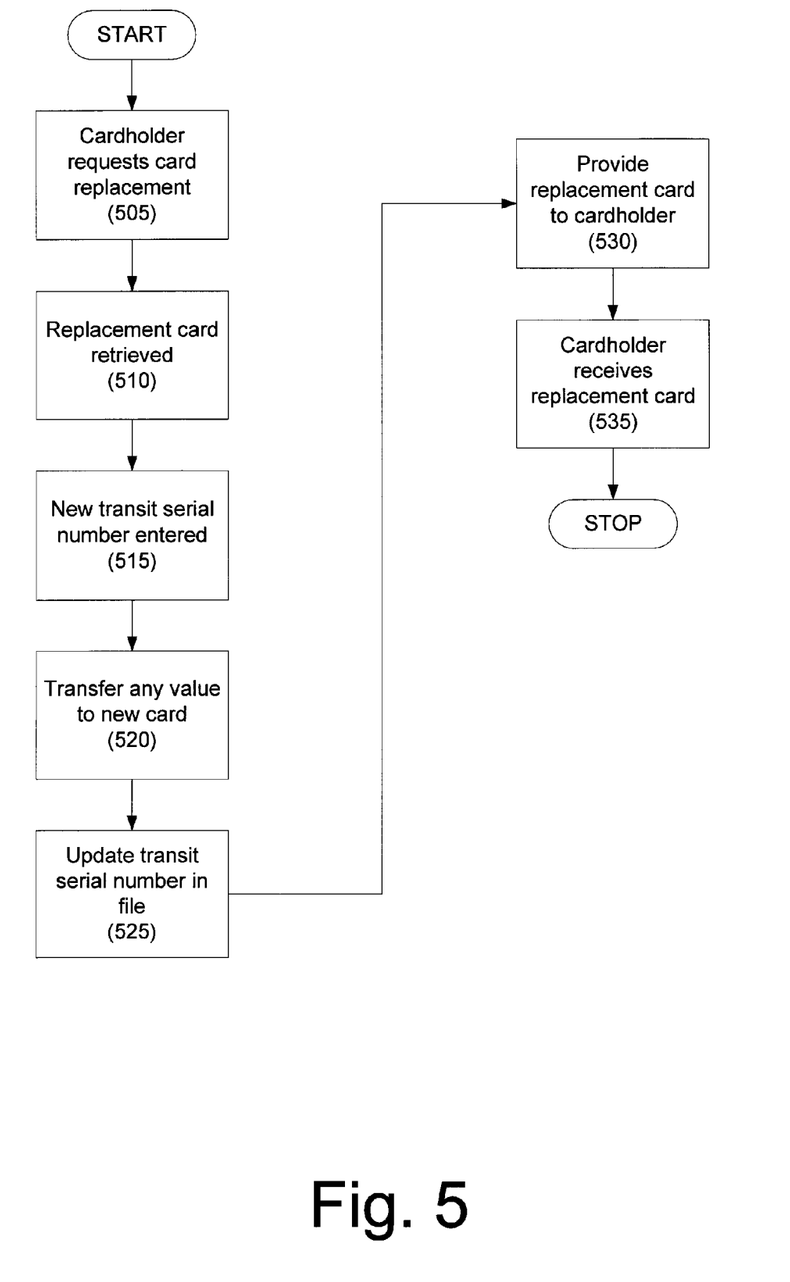
FIG. 5 is a flowchart depicting a method for replacing a multi-purpose device according to an embodiment of the present invention.

Referring to FIG. 5, a method for multi-purpose device replacement according to one embodiment is provided. In step 505, a device holder may request replacement of a multi-purpose device. The multi-purpose device may be, for example, lost, stolen, damaged, etc.

In one embodiment, the multi-purpose device replacement request includes the transit serial number from the device to be replaced. In another embodiment, the device replacement request may include the financial account number. Other information may be included in the request as necessary and/or desired.

In step 510, a replacement device is retrieved. In one embodiment, this step may be similar to the steps discussed above.

In step 515, the transit serial number for the device to be replaced is entered. In one embodiment, this may be done automatically by a machine reading the transit serial number from the multi-purpose device. In another embodiment, the transit serial number may be entered manually.

In one embodiment, a new link file may be generated that identifies the multi-purpose device as a replacement device, identifies the device that is being replaced, etc.

In one embodiment, a link to the transit authority's account systems may be provided at the device processing center. For example, a terminal with access to the transit authority's accounts may be provided. This may allow representatives at the financial institution to access the transit authority's system to create, modify, maintain, etc. transit accounts that are linked to an account at the financial institution.

In one embodiment, the link file may be sent to the transit authority for the transit authority to update the multi-purpose device information.

In one embodiment, the system may also verify the identity of the multi-purpose device holder.

In step 520, any value associated with the old transit serial number may be transferred to the new transit serial number. The value transferred is not limited to a financial value. In one embodiment, this may also include transferring device status (e.g., rides/accesses remaining), pass status (e.g., daily, monthly, weekly pass, etc.), or any other information/status that may be associated with the transit feature of the multi-purpose device.

Thus, even though the device holder may have chosen to remain anonymous, any value associated with a device that needs replacement may be recovered.

In step 525, the device link file may be updated. In one embodiment, this may include replacing the old transit serial number with the new transit serial number.

In step 530, the device may be provided to the device holder. This is similar to step 425, described above.

In step 535, the device holder may receive the device and perform any necessary device activation or registration actions. This is similar to step 430, described above.

In one embodiment, the value may not be transferred to the replacement device until the replacement device is activated. This may be useful when, for example, a replacement credit card is sent to a cardholder in advance of a credit card expiration date. The to-be-replaced card may remain active until the cardholder activates the replacement card.

In one embodiment, the device holder may be able to access his or her transit summary through the issuing bank's website, on a mobile device, etc.

In one embodiment, the device holder may be provided with additional features, including voice, email, and text notifications of transit device activity or account balance (e.g., use of the device for transit, low account balance, summary of activity, etc.) or restrictions on use of the device (e.g., device is not to be used after 8:00 PM for transit fare, etc., no charges outside of the United States, etc.).

In one embodiment, the device holder may maintain his or her financial and/or transit account. For example, the device holder may claim that the device is lost, damaged, or stolen; freeze the transit value (including rides, accesses remaining, etc.) if, for example, the device holder was going on vacation; reactivate the device; etc. In one embodiment, the device holder may perform any necessary maintenance on-line, by telephone, in person with the financial institution or the transit authority, by mail, etc.

In one embodiment, the system may "learn" a device holder's transit patterns. For example, if the device holder normally takes the red line to the blue line every day, the system may learn this pattern. In one embodiment, the system may alert the device holder when there may be a delay in the learned route. This alert may be provided at the station when the device holder enters the station, by a text/email/voice message in advance of entry, or by any suitable means. In one embodiment, the system may suggest alternative routes and/or transit options (e.g., bus instead of rail) to the device holder.

In another embodiment, an alert or notification may be provided when the multi-purpose device is used. For example, if a child uses the multi-purpose device to access and ride a bus, train, school bus, etc., a message (e.g., voice, SMS, email, etc.) may be sent to a parent, guardian, school official, etc.

In another embodiment, the multi-purpose device may be used to access employer or government-subsidized programs. For example, a student may use the multi-purpose device to pay for school lunches, pay for bus fare, etc. In another embodiment, an individual may use the multi-purpose device to pay for subsidized food, meals, etc.

In another embodiment, an alert or notification may be provided when the device holder approaches or uses an ATM, a RF-enabled device, etc. The alert or notification may be provided at the ATM or RF-enabled device, to the multi-purpose device, to the device-holder's mobile device, etc.

In one embodiment, the multi-purpose device may be used in the same manner that a traditional paper ticket may be used. For example, instead of a train conductor punching a paper ticket, or collecting fares, the conductor may instead use the multi-purpose device to track or charge the device holder's trip. In another embodiment, this may be fully automated.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically-distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, communications channel, a satellite transmission, memory card, SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialog screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for providing a multi-purpose device for use with a plurality of systems, comprising:
   a first party assigning a first account number to the multi-purpose device, the first account number associated with a first account with the first party for use in a first system;
   the first party assigning a second account number to the multi-purpose device, the second account number associated with a second account with a second party for use in a second system;
   the first party, using at least one of a plurality of computer processors, linking the first account number to the second account number;
   the first party providing the second party with an electronic file comprising at least one of the first account number and the second account number, and a match number common to both the first account number and the second account number; and
   the first party issuing the multi-purpose device to a customer.

2. The method of claim 1, wherein the first party is a financial institution.

3. The method of claim 2, wherein the second party is a transit authority.

4. The method of claim 2, wherein the second party is one of a municipality, a parking authority, a school district, a government agency, a country club, and a shopping club.

5. The method of claim 1, further comprising:
the first party activating the first account and the second account in response to an activation of the first account.

6. The method of claim 1, wherein the electronic file further comprises at least one of an initial value, a new/replacement indicator, a transit rider type, a date of issue, a date of replacement, a random number, a counter, and payment information.

7. The method of claim 1, wherein the first account number and the second account number are visible on the multi-purpose device.

8. The method of claim 1, wherein the multi-purpose device is one of a transaction card, a smart card, a fob, a sticker, a token, a memory card, a mobile phone, and a PDA.

\* \* \* \* \*